United States Patent [19]

Oishi

[11] Patent Number: 4,788,615
[45] Date of Patent: Nov. 29, 1988

[54] MEANS FOR ADHERING THE MAGNETIC DISK TO THE CENTER CORE IN A MAGNETIC DISK CARTRIDGE

[75] Inventor: Kengo Oishi, Odawara, Japan
[73] Assignee: Fuji Photo Film Co., Ltd., Japan
[21] Appl. No.: 96,272
[22] Filed: Sep. 9, 1987

Related U.S. Application Data

[63] Continuation of Ser. No. 765,869, Aug. 14, 1985, abandoned.

[30] Foreign Application Priority Data

Sep. 4, 1984 [JP] Japan .................... 59-134325[U]

[51] Int. Cl.$^4$ ..................... G11B 5/82; G11B 23/03
[52] U.S. Cl. ..................... 360/135; 360/133
[58] Field of Search ............ 360/133, 135, 97–99; 369/290, 291; 206/444, 405; 156/293, 290, 514, 252, 253

[56] References Cited

U.S. PATENT DOCUMENTS 3,718,519  2/1973  Montgomery ............... 156/290 X
3,902,949  9/1975  Norman ....................... 156/252
4,562,505  12/1985  Mroz .......................... 360/135
4,573,097  2/1986  Pastor et al. ............... 360/135

FOREIGN PATENT DOCUMENTS 1132351  6/1962  Fed. Rep. of Germany ...... 369/290

Primary Examiner—Robert S. Tupper
Assistant Examiner—Andrew L. Sniezek
Attorney, Agent, or Firm—Pasquale A. Razzano

[57] ABSTRACT

A magnetic disk assemblage rotatably housed in a magnetic disk cartridge comprises a center core which is cylindrical in shape and is provided with a floor, in the center of which is a hole for a drive shaft, and, at its upper edge, with a flange. The flange is provided with a plurality of small through-holes. For assembly, the cylindrical portion is inserted into a central hole formed in the magnetic disk, and the core and disk are fixed together by inserting instantaneous adhesive into the space between the lower surface of the flange and the upper periphery of the holes in the disk, via the through-holes.

1 Claim, 1 Drawing Sheet

MEANS FOR ADHERING THE MAGNETIC DISK TO THE CENTER CORE IN A MAGNETIC DISK CARTRIDGE

This application is a continuation of application Ser. No. 765,869, filed Aug. 14, 1985, now abandoned.

BACKGROUND OF THE INVENTION

1. Field of the Invention

This invention relates to a magnetic disk cartridge containing a thin magnetic disk of small diameter which is rotated for image recording and reproduction thereon. More particularly, this invention relates to a structure for adhering the magnetic disk to a center core.

2. Description of the Prior Art

Recording media comprising floppy disks which consist of a base of flexible polyester sheet or the like which is coated on both sides with a layer of magnetic material in which information is recorded digitally by means of a magnetic head have been developed which are widely used as recording media for computers because of their handling ease and convenience and low cost. In recent years the so-called microfloppy disk has started to be introduced commercially. For improved handling convenience, reliability and resistance to dust and dirt, the microfloppy disk is smaller and is housed in a hard case of plastic resin provided with a magnetic head access window which has a shutter. There has been proposed a still camera using such floppy disks as image recording media to utilize the above adantages of the floppy disk and the advantage of reusability of the recording media provided by magnetic recording and not possessed by silver-based photographic film. The magnetic disks for use in such a still camera, which is about the size of a conventional 35 mm camera, are even smaller ànd thinner and are housed in a magnetic disk cartridge which also has been made smaller and of a hard material (and which for brevity will from now on be referred to herein simply as "cartridge") in which the media is rotated at high speed for the recording and reproduction.

In order to record large quantities of information on the small magnetic disks employed in these small cartridges, recording densities have become extremely high, so that the slightest deformation or displacement of the disk produces spacing loss, being poor or uneven contact between the magnetic read/write head and the disk, producing uneven electromagnetic conversion readout output and distortion of the information recording/reproduction, in all likelihood making it difficult to achieve good recording/reproduction. Also, unlike the conventional floppy disk wherein a central locating hole is utilized in the support of the disk by two mechanical members of the disk drive which hold the disk therebetween, with the cartridge the disk is provided with a center core into which a shaft is fitted from one side to provide the rotation. In order to transmit the rotation to the disk it is necesssary that the disk and core be fixed together. Various tecniques are used to prevent deformation to the disk during this fixing process. An example of one such method is shown in FIG. 3, in which a floored, cylindrical center core 1 which has a hole 1a in the center of the floor and a flange 1b around its upper periphery is adhered to a magnetic disk 2 which has a center hole 2a by means of a ring-shaped double-sided adhesive member 3 interposed between the lower surface of the flange 1b and the upper edge of the hole 2a, and assembly is by the insertion of the cylindrical portion 1c of the center core 1 into the inner hole 2a. This method allows the assembly to be carried out automatically by means of robots. However, this method does require the use of an adhesive member, such as the double-sided adhesive tape 3, and the pressure at the time of the adhesion produces non-uniformity in the thickness of the adhesive tape, causing wrinkling of the disk, and as to the precision of the concentricity with which the adhesive tape 3 is automatically fixed to the lower surface of the flange 1b of the center core 1 and around the periphery of the inner hole 2a of the disk 2, it is easy for the adhesive tape to be adhered out of true with respect to the center core or the disk prior to the completion of final assembly, and because the positional correction of the disk or center core is difficult, this has given rise to problems of cost and productivity.

SUMMARY OF THE INVENTION

The object of this invention is to provide a cartridge of simple structure which enables the center core and the disk easily to be adhered in the correct position without the use of double-sided adhesive tape.

The present invention provides a cartridge comprising a center core flange provided with a plurality of small through-holes through which instantaneous adhesive is inserted after the cylindrical portion of the center core has been fitted into the hole formed in the center of the disk and the lower surface of the flange brought into contact with the upper edge of the center hole of the disk, so as to thereby adhere the center core to the disk.

As in accordance with this invention the center core is adhered to the disk by means of the introduction of instantaneous adhesive through the plurality of through-holes with which the flange of the center core is provided, it is extremely easy to affix the center core concentrically with the disk while containing the production of distortion of the disk, without recourse to any adhesive member such as the double-sided adhesive tape conventionally employed, in addition to which, as the adhesion is carried out after the disk and center core have been centered, distortion of the media arising through misalignment is alleviated, so the present invention contributes greatly to reducing costs and improving productivity.

DESCRIPTION OF THE PREFERRED EMBODIMENTS

The present invention will now be described in further detail with reference to the accompanying drawings.

Figure 1:
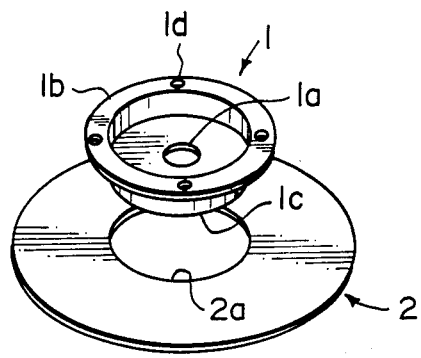
FIG. 1 is a perspective view showing the parts making up one embodiment of the magnetic disk assembly according to this invention.
Figure 2:
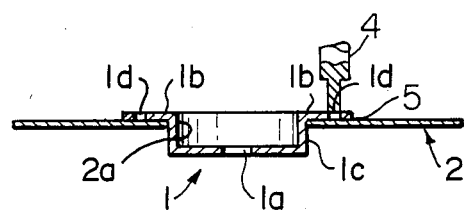
FIG. 2 is a sectional view of an embodiment of the magnetic disk assembly according to this invention.
Figure 3:
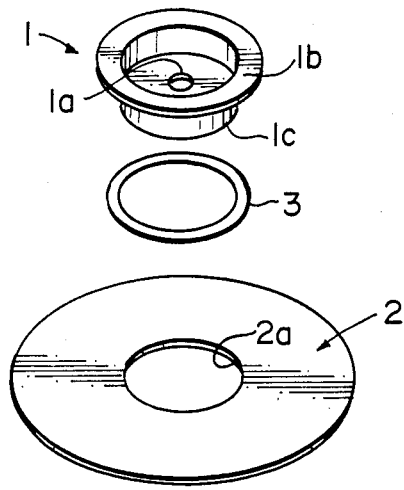
FIG. 3 is a perspective view showing the parts making up a conventional magnetic disk assembly.

With reference to the type of magnetic disk assembly shown in FIGS. 1 and 2, a cylindrically-shaped center core which has a floor in the center of which is a hole 1a and is provided at its upper periphery with a flange 1b is assembled with a magnetic disk 2 by the insertion of the cylindrical portion 1c of the core into the hole 2a formed in the center of the disk 2, bringing the lower surface of the flange 1b of the center core 1 into contact with the upper periphery of the hole 2a in the magnetic disk 2. A plurality of small through-holes 1d are formed in the flange 1b via which a small quantity of instantaneous adhesive of an appropriate viscosity, such as for example ARONALFA (manufactured by Toa Chemical Industries), is inserted by means of an injector 4 of the like, so that the instantaneous adhesive permeates the space or gaps 5 between said lower surface of the flange 1b and said upper periphery of the disk hole 2a to provide instant adhesion.

A drive shaft in the disk drive fits into and rotates the center core 1 of the magnetic disk assembly thus assembled and rotatably housed in the cartridge. As the center core 1 is rotated the magnetic disk 2 adhering thereto is also rotated, enabling information to be recorded on or reproduced from the disk.

I claim:

1. A magnetic disk cartridge comprising a cylindrical center core having a floor and provided with a circumferentially flat flange at its upper surface; and a circumferentially flat magnetic disk provided with a central hole into which the cylindrical core is fitted; the flange being provided with a plurality of through-holes such that after the flat lower surface of the flange has been brought into contact with the flat upper surface of the magnetic disk, the center core and the magnetic disk are adhered together by the insertion via said through-holes of a generally flowable adhesive under a pressurized force which permeates beyond the through-holes into a gap formed by the pressure of the adhesive only between the circumferentially flat lower surface of the flange and the circumferentially flat upper surface of the magnetic disk.

* * * * *